United States Patent
Hubert et al.

(10) Patent No.: US 10,122,713 B2
(45) Date of Patent: Nov. 6, 2018

(54) METHOD AND DEVICE FOR THE SECURE AUTHENTICATION AND EXECUTION OF PROGRAMS

(71) Applicant: COMMISSARIAT A L'ENERGIE ATOMIQUE ET AUX ENERGIES ALTERNATIVES, Paris (FR)

(72) Inventors: Laurent Hubert, Guyancourt (FR); Renaud Sirdey, Cernay-la-Ville (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 51 days.

(21) Appl. No.: 15/027,963

(22) PCT Filed: Oct. 3, 2014

(86) PCT No.: PCT/EP2014/071222
§ 371 (c)(1),
(2) Date: Apr. 7, 2016

(87) PCT Pub. No.: WO2015/052084
PCT Pub. Date: Apr. 16, 2015

(65) Prior Publication Data
US 2016/0261592 A1  Sep. 8, 2016

(30) Foreign Application Priority Data

Oct. 8, 2013  (FR) .................................. 13 59732

(51) Int. Cl.
*H04L 29/06* (2006.01)
*G06F 21/53* (2013.01)
(Continued)

(52) U.S. Cl.
CPC ...... *H04L 63/0869* (2013.01); *G06F 9/45558* (2013.01); *G06F 21/53* (2013.01);
(Continued)

(58) Field of Classification Search
CPC .................................................. H04L 63/0869
(Continued)

(56) References Cited

U.S. PATENT DOCUMENTS 6,895,506 B1   5/2005  Abu-Husein
2004/0210821 A1* 10/2004 Kasser .................. G06F 21/10
715/255

(Continued)

FOREIGN PATENT DOCUMENTS

EP   2 278 514 A1   1/2011

OTHER PUBLICATIONS

A. Averbuch et al., "An Efficient VM-Based Software Protection," 2011 IEEE, pp. 121-128.

*Primary Examiner* — Peter C Shaw
(74) *Attorney, Agent, or Firm* — Baker & Hostetler LLP

(57) ABSTRACT

A device and a method for encrypting a virtual machine by on-the-fly encryption and decryption of the memory is described. The device comprises hardware and software elements, including a hardware security module for executing, in response to data read/write requests, on-the-fly encryption and decryption operations of the data stream associated with an encrypted memory image. The device and the method are particularly suited to allowing the secure authentication and execution of programs in the context of the infrastructure as a service layer of the cloud computing model.

16 Claims, 3 Drawing Sheets

(51) Int. Cl.
*H04L 29/08* (2006.01)
*G06F 9/455* (2018.01)
*H04L 9/08* (2006.01)

(52) U.S. Cl.
CPC ............ *H04L 9/0861* (2013.01); *H04L 63/08* (2013.01); *H04L 67/1002* (2013.01); *G06F 2009/4557* (2013.01); *G06F 2221/034* (2013.01)

(58) Field of Classification Search
USPC ....................................................... 713/169
See application file for complete search history.

(56) References Cited

U.S. PATENT DOCUMENTS

| | | | | |
|---|---|---|---|---|
| 2006/0198514 | A1* | 9/2006 | Lyseggen | H04L 9/3231 380/28 |
| 2011/0302400 | A1* | 12/2011 | Maino | G06F 21/575 713/2 |
| 2012/0173866 | A1* | 7/2012 | Ashok | G06F 21/575 713/150 |
| 2013/0212386 | A1* | 8/2013 | Rastogi | H04L 9/3263 713/168 |
| 2014/0033200 | A1* | 1/2014 | Tompkins | H04L 63/061 718/1 |

\* cited by examiner

METHOD AND DEVICE FOR THE SECURE AUTHENTICATION AND EXECUTION OF PROGRAMS

CROSS-REFERENCE TO RELATED APPLICATIONS

This application is a National Stage of International patent application PCT/EP2014/071222, filed on Oct. 3, 2014, which claims priority to foreign French patent application No. FR 1359732, filed on Oct. 8, 2013, the disclosures of which are incorporated by reference in their entirety.

BACKGROUND

The invention relates to the field of virtualization and in particular relates to the secure authentication and execution of programs.

PRIOR ART

A major issue for infrastructures using cloud computing is data security and confidentiality.

Cloud computing provides an environment for saving data on remote servers, and is based on three service layers. The bottom layer is the Infrastructure as a Service (IaaS) layer, which provides hardware computing items such as servers, routers and storage disks. The intermediate layer is the Platform as a Service (PaaS) layer, which provides operating environments (operating systems and associated applications). The top layer is the Software as a Service (SaaS) layer, which provides applications hosted remotely and forming the cloud.

As part of an IaaS service, the computing hardware for a client (company or individual), user of the service, is hosted and managed by an IaaS provider. For the sharing of computing resources between clients, the IaaS provider generally resorts to virtualization techniques using Virtual Machines (VMs) including VM monitors or hypervisors. The IaaS provider is hence responsible for the security of the virtual machines, and the security and integrity of the data contained in the machines. The programs must be executed securely therein. However, the hypervisor is a software layer between the hardware and the operating system which, in the event of attacks, can behave maliciously.

Thus, secure execution of programs is a need which has given rise to a number of approaches. Some solutions are described below.

Patent application U.S. 2012/0173866 A1 by R. Ashok et al., entitled "System for securing virtual machine disks on a remote shared storage subsystem", proposes a software solution of storage and execution of encrypted VMs within the cloud computing model in which the hypervisor of the cloud takes care of selecting a virtual machine to be activated and of establishing a decryption key.

In patent U.S. Pat. No. 6,895,506 by L. Abu-Husein, entitled "Secure storage and execution of processor control programs by encryption and a program loader/decryption mechanism", a purely software-based solution is described for the execution of encrypted programs. Instructions of the program form encrypted program blocks. When it is being executed, the program is decrypted and placed in a temporary memory. At the end of the execution, the memory is erased. A drawback of this approach is that the program placed in temporary memory is stored in clear form and hence leaves the possibility of attacks by a low level software layer that has become malicious.

The article by A. Averbuch et al., "An efficient VM-based software protection" 121-128, 2011, describes a system which allows the execution of encrypted programs. The programs are encrypted and decrypted with the aid of a "framework" which is also the entity that manages the memory accesses. The drawback of this approach is that it is entirely software.

Other solutions based on homomorphic encryption of circuits exist, but exhibit the drawback of introducing additional load which considerably impacts the overall performance of the infrastructure.

Thus, the known solutions do not meet the need for a secure execution of programs in an environment of virtual machines, and in particular in the context of an infrastructure as a service model of cloud computing. The proposed invention provides for meeting this need.

SUMMARY OF THE INVENTION

An object of the present invention is to propose a system and a method for encrypting a virtual machine by on-the-fly encryption and decryption of the memory.

Advantageously, the solution of the invention which comprises hardware and software elements does not require that the processor of the server which executes the encryptions/decryptions be modified.

Thus advantageously, only one component, the module which executes the on-the-fly encryption/decryption, has access to the encrypted memory.

Advantageously, the code of the executed program is not visible to the hypervisor.

The device of the invention provides for protecting against relocation attacks and known-cleartext attacks which could occur; indeed the probability that two identical cleartexts have the same encryption being negligible due to the format of the encrypted blocks.

Another object of the present invention is to propose a method for the secure authentication and execution of programs in the context of the Infrastructure as a Service (IaaS) layer of the cloud computing model. The method provides for making the link between the physical security of the servers of the computing cloud and the system security. The user is thus ensured that his/her memory image, including the instructions and the data in the cloud, is protected against any software corruption of the hypervisor layer.

According to the invention, each encrypted program will establish an encryption/decryption key specific to each virtual machine, which key is loaded in the encryption module.

Still according to the invention, the hypervisor executes a time interrupt before restoring the context of a virtual machine. During the interrupt, the hypervisor gives control to a VM. Thus, advantageously, the method according to the invention provides for executing inputs/outputs under interrupt without any modification of the processor used.

The invention applies to a cloud computing environment composed of a plurality of servers and client terminals suitable for connecting to the cloud. One of the servers comprises a processor and a main memory enabling the execution of hypervisor software in order to assign virtual machines to the client terminals. The device comprises:
  an encrypted memory image generation module for generating, in response to a request to connect to the cloud from a user terminal, an encrypted memory image of a virtual machine assigned to the client terminal;
  a storage server to store the encrypted memory image; and
  a security module coupled to the storage server and to said one of the servers, to execute, in response to data read/write requests received from the processor of said one of the servers, on-the-fly encryption and decryption operations of the data stream associated with said encrypted memory image.

In one particular implementation, the encrypted memory image generation module comprises means for:
receiving a request to connect to the cloud from a client terminal;
establishing a bilaterally authenticated connection between the client terminal and the cloud;
generating a private encryption key to assign a virtual memory image to the client terminal;
downloading to the client terminal the assigned virtual memory image;
encrypting the assigned virtual memory image; and
uploading the assigned and encrypted virtual memory image to the cloud.

Advantageously, the means for establishing the authenticated connection between the client terminal and the cloud comprise chip card reader type means coupled to the client terminal to calculate an encryption key as a function of a personal code stored on the chip card and means coupled to an authentication server of the cloud for performing an authentication upon reception of the personal code.

Advantageously, the personal code is a 128-bit long term secret.

Still advantageously, the private encryption key generated for a virtual machine is a function of the personal code. It is advantageously stored in the authentication server.

In a particular mode of operation, the execution of an on-the-fly encryption or decryption operation performed in response to a request to read a word at a clear address of the memory of one of the servers consists in:
receiving from the authentication server the private encryption key;
retrieving in the encrypted memory image an encrypted data block containing the clear address of the word to be read;
decrypting the encrypted block with the private encryption key;
extracting the word to be read in the decrypted block; and
sending the extracted word to the processor of said one of the servers.

In another particular mode of operation, the execution of an on-the-fly encryption or decryption operation performed in response to a request to write a word at a clear address in the memory of said one of the servers consists in:
receiving from the authentication server the private encryption key;
retrieving in the encrypted memory image an encrypted data block containing the clear address of the word to be written;
decrypting the encrypted block with the private encryption key; and
writing the word at the clear address in the decrypted block.

Advantageously, the input/output operations are carried out under interrupt and the device comprises an interrupt management module.

Another subject of the invention is a method performed in a cloud computing environment composed of a plurality of servers and client terminals suitable for connecting to the cloud. One of the servers comprises a processor and a main memory enabling the execution of hypervisor software in order to assign virtual machines to the client terminals, and the method comprises the steps of:

in response to a request to connect to the cloud from a client terminal, generating an encrypted memory image of a virtual machine assigned to the client terminal;
storing on a storage service the encrypted memory image; and
in response to data read/write requests received from the processor of said one of the servers, executing on-the-fly encryption and decryption operations of the data stream associated with said encrypted memory image.

Advantageously, the step for generating an encrypted memory image additionally comprises the steps of:
receiving a request to connect to the cloud from a client terminal;
establishing a bilaterally authenticated connection between the client terminal and the cloud;
generating a private encryption key to assign a virtual memory image to the client terminal;
downloading to the client terminal the assigned virtual memory image;
encrypting the assigned virtual memory image; and
uploading the assigned and encrypted virtual memory image to the cloud.

In a particular mode of operation, the step for establishing the authenticated connection between the client terminal and the cloud comprises a step for calculating an encryption key as a function of a personal code stored on a chip card read by chip card reader means coupled to the client terminal and a step for authenticating the personal code upon reception of the code by the authentication server.

In another particular mode, the execution of an on-the-fly encryption or decryption operation is performed in response to a request to read a word at a clear address of the memory of said one of the servers and comprises the steps of:
receiving from the authentication server a private encryption key;
retrieving in the encrypted memory image an encrypted data block containing the clear address of the word to be read;
decrypting the encrypted block with the private encryption key;
extracting the word to be read in the decrypted block; and
sending the extracted word to the processor of said one of the servers.

In a variant mode of operation, the execution of an on-the-fly encryption or decryption operation is performed in response to a request to write a word at a clear address in the memory of said one of the servers and comprises the steps of:
receiving from the authentication server a private encryption key;
retrieving in the encrypted memory image an encrypted data block containing the clear address of the word to be written;
decrypting the encrypted block with the private encryption key; and
writing the word at the clear address in the decrypted block.

The invention can operate in the form of a computer program product which comprises code instructions for carrying out the steps of the claimed method when the program is executed on the computer.

BRIEF DESCRIPTION OF THE DRAWINGS

Various aspects and advantages of the invention will become apparent from the description of a preferred but nonlimiting implementation of the invention, with reference to the following drawings in which.

DETAILED DESCRIPTION OF THE INVENTION

Figure 1:
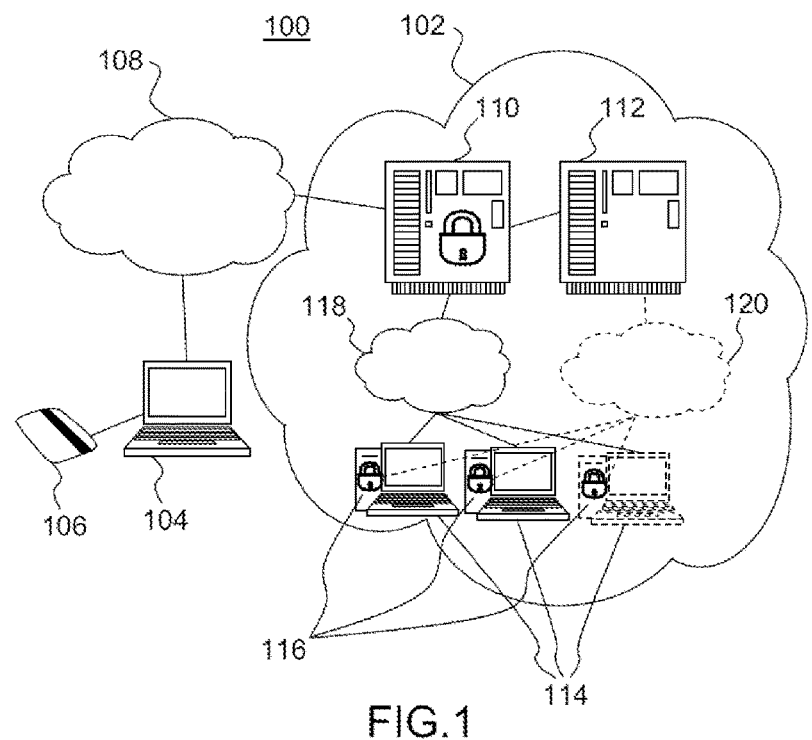
FIG. 1 schematically illustrates a computing cloud environment in which to advantageously implement the invention.

FIG. 1 schematically illustrates a computing cloud environment 100 in which to advantageously implement the invention. It must be understood that the environment shown is illustrative of an example of an infrastructure as a service in a computing cloud model intended to enable the understanding of the invention, but that all the elements of such an environment are not necessarily illustrated. Upon reading the description, it will become apparent to the person skilled in the art that variants can be brought to the implementation described.

FIG. 1 shows the Infrastructure as a Service (IaaS) for a computing cloud 102 through which a user or subscriber can access services and applications.

The user connects to the cloud via a terminal 104 commonly called host or client terminal and equipped with a device 106 for carrying out cryptographic operations securely. Such a device can for example be a chip card. Access by the client to the computing cloud can pass through an unsecure network 108 such as the public Internet network.

The user is authenticated by the chip card by a password mechanism such as identification by a personal identification number or PIN code for example. The chip card is used to carry out operations in which the notion of security is essential such as the storage of a Long Term Secret (LTS) which is unique for each chip card or to carry out algorithmic operations such as challenge/response authentication and key establishment. Moreover, the chip card can include a pseudorandom number generator. Such a chip card can be supplied and maintained by the cloud computing operator.

The cloud 102 comprises one or more routers 110 such as relays or gateways, one or more authentication servers 112, denoted by "AuS" for "Authentication Server", and a set of machines or VM servers 114 for operating virtual machines. Each server can be equipped with a simple or multicore processor. Each processor core is associated, at least functionally, with a security module 116, denoted by "HSM" for "Hardware Security Module".

The router 110 offers an interface between the computing cloud 102 and the unsecure external network 108 to which the client connects to access the cloud.

The authentication server 112 (AuS) is a database that is critical in terms of security, containing among other items the Long Term Secrets (LTSs) associated with each client. The authentication server also supplies all the algorithmics for establishing authentication keys for the challenge/response procedures.

The VM servers 114 are the machines on which the virtual machines associated with the users will be executed. Each VM server (114) executes hypervisor software, or a hypervisor, to efficiently share the resources between the various virtual machines (VMs).

Each VM server is coupled to a security module 116, the content and functions of which are not physically accessible by the processor. The HSM security module acts as a proxy and is responsible for on-the-fly decryptions/encryptions of data and instructions which enter and leave the processor. The HSM module has a privileged relationship with the authentication server 112, as it is the only component of a server having the rights to send requests to the authentication server.

Two independent networks (118, 120) operate within the computing cloud. A first user network 118 provides an interconnection between a user network interface of a server (110) and the whole of the cloud infrastructure. A second control network 120 provides the interconnection of HSM modules with the authentication server via a dedicated controlled network interface.

Figure 2:
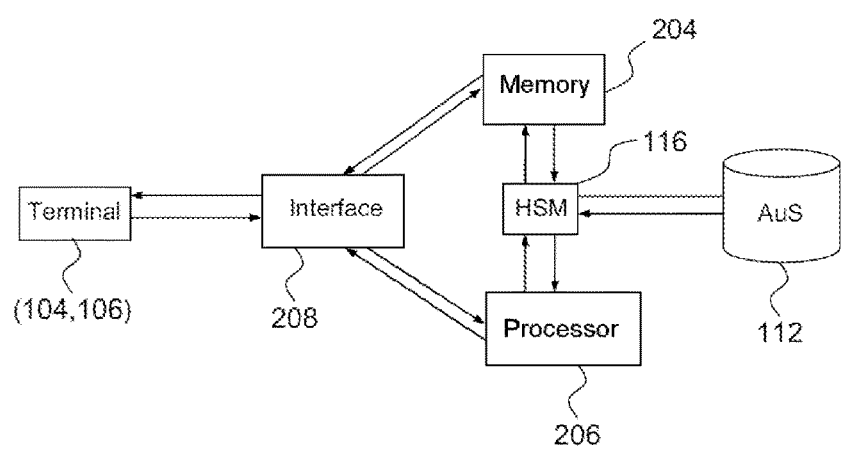
FIG. 2 is a diagram of the components of the device of the present invention.

FIG. 2 schematically shows the components of the device of the present invention. It is to be noted that the components described with reference to FIG. 1 are denoted by the same references.

A security module 116 is coupled on the one hand to the processor 206 of a VM server and on the other hand to the main memory 204 of the VM server. The security module is in communication with the authentication server 112 in order to send requests via the control network 120.

In a preferred implementation, the processor used is a RISC (Reduced Instruction Set Computer) processor, and more particularly a 32-bit PMIPS32 (Microprocessor without Interlocked Pipeline Stages) processor. The communication buses are 32-bit, and the main memory operates over a range from 0 to 0xffffffff. The HSM security module is an MMC (Memory Model Component) type memory.

Figure 3:
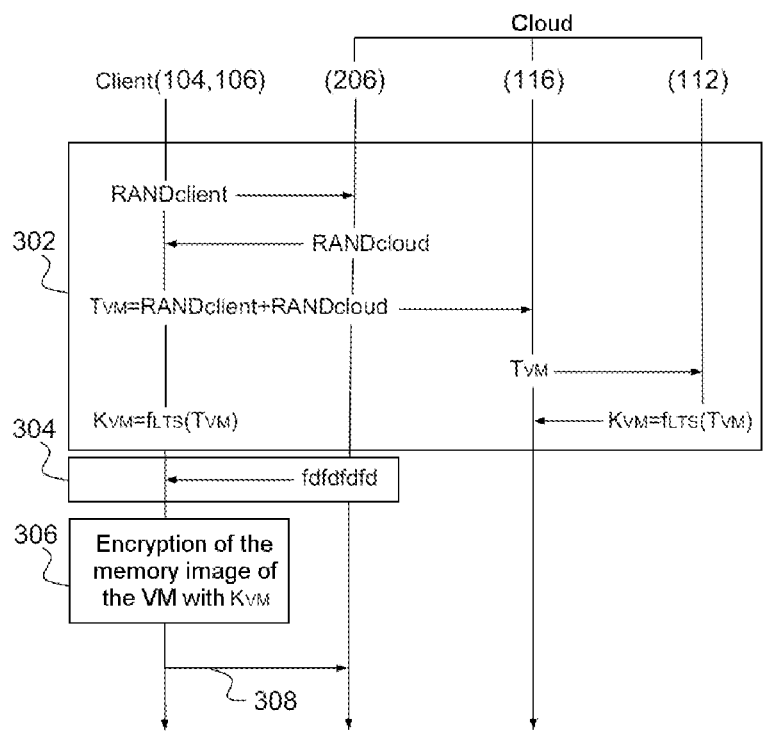
FIG. 3 shows the procedure executed for the encryption of a memory image during the creation of a virtual machine.

FIG. 3 shows the procedures executed for the encryption of a memory image during the creation of a virtual machine for a client terminal. The memory footprint of the VM is defined statically when it is created.

According to the method of the invention, the creation of an encrypted VM for a client is carried out according to the following steps:
  302: Establishment of a bilaterally authenticated and private connection between the client and the cloud;
  304: Downloading to the client station an empty virtual memory image from the cloud;
  306: Encryption of the virtual memory image on the client station; and
  308: Uploading of the encrypted virtual memory image in the cloud on the virtual machine associated with the client.

In one variant, the encryption of the virtual memory image can be performed at the cloud in the authentication server.

It is to be noted that the encryption key of a virtual machine is specific to each virtual machine.

When a virtual machine has been created, the latter can be used according to the following steps:
  Establishment of a bilaterally authenticated and private connection with the cloud;
  Selection and connection to the existing virtual machine in order to obtain the encryption key; and Interaction with the selected virtual machine.

The step for establishing the authenticated connection with the cloud is optional if the connection has already been established during a previous operation. The aim of the bilateral authentication step is to provide both parties, the client and the cloud, the guarantee that they are communicating with the correct entity. It also supplies a session key to create a private communication tunnel (VPN) using symmetric algorithms.

In a preferred implementation, the connection to the cloud is carried out with a chip card which contains a personal code for the requester, preferably a 128-bit Long Term Secret (LTS) key. This unique key at each client is only known by the cloud via the authentication server (AuS) and is used during the establishment of encryption and decryption keys.

In a preferred mode, the authentication step 302 is performed by an exchange according to the challenge/response principle which runs according to the following known steps:

- The cloud and the client send each other a 128-bit challenge of random items: $RAN_{ClouD}$ for the cloud, $RAND_{ClienT}$ for the client;
- The cloud and client calculate the responses: $RES_{ClouD}=f_{LTS}(RAND_{ClienT})$ for the cloud, $RES_{Client}=f_{LTS}(RAND_{CD})$ for the client;
- The cloud and the client send each other their responses: $RES_{ClouD}$, $RES_{ClienT}$; and
- The cloud and the client respectively carry out the same calculation and check whether the value received is definitely the one calculated, thus ensuring authentication.

Advantageously, step 306 for encrypting the memory image of the VM is carried out during the subscription of the client to the cloud. When connecting to the cloud, a token $T_{VM}$ is generated from two 128-bit random items which have been generated for the challenge. This token of value $T_{VM}=RAND_{CD} \oplus RAND_{CT}$ is unique and uniquely associated with the virtual machine assigned to the user.

Advantageously, the token $T_{VM}$ does not need to be secret since the encryption key $K_{VM}$ used for the virtual memory is calculated as a function of the secret and of the token in the following manner:

$$K_{VM}=f_{LTS}(T_{VM})$$

Whenever needed, the key can be recalculated.

To illustrate in an example of a preferred implementation, the data of the memory image of the virtual machine associated with an execution platform for a 32-bit machine is encrypted as follows:

Let $w_0, w_1, \ldots, w_{2N-1}$ be the sequence of $2N \leq 2^{32}$ 32-bit words forming the memory image of the VM. The 64 bits of the pairs $(w_{2i}, w_{2i+1})(i=0 \ldots N-1)$ are replaced by a 128-bit block "$B_i$" calculated as follows:

$$B_i = AES_{K_{VM}}(w_{2i} \| w_{2i+1} \| 0x0000 \| R_{18} \| 2i)$$

where $\|$ is the concatenation operator and $R_{16}$ is a 16-bit random number. The pair $(w_{2i}\|w_{2i+1})$ represents the data or instruction payload of the 128-bit block. The remaining 64 bits provide the appropriate security properties.

Thus, the probability for a third party to forge a valid block without knowing $K_{VM}$ is at best $2^{-48}$ since decrypting a block "$B_i$" comes back to finding 128 bits of random items which have 16 zero bits and 32 offset bits corresponding to the format of the block in clear form.

Still advantageously, the presence of a random number $R_{16}$ prevents the same clear payload successively at the same position from having two identical 128-bit encrypted blocks.

Moreover, the field $2i$ represents the address of the block relatively with respect to the start of the memory image of the VM. This ensures that two blocks that are identical in terms of payload do not have the same encryption even if the 16 bits of random items are identical. Thus a known encryption algorithm such as the Advanced Encryption Standard (AES) can be used in Electronic Code Book (ECB) mode in order to be able to access the memory randomly. However, other encryption algorithms can be used, such as the CAST-128 algorithm, for example.

An additional advantage of the presence of the field $2i$ is ensuring that a valid encrypted block belonging to a VM cannot be displaced within the memory image of the same VM. Thus, relocation attacks are prevented since the field $2i$ obtained after the decryption of the block will no longer correspond to the relative address to which the encrypted block was rewritten. In terms of efficiency, the memory footprint of the VM is improved by a factor of 2.

In a variant mode of operation, only the initialized part of the memory image of the VM can be sent to the client to be encrypted in order to avoid large data transfers between the cloud and the client. The non-initialized part of the memory image of the VM is then formed by predefined 128-bit blocks, for example fdfd . . . fd.

Figure 4:
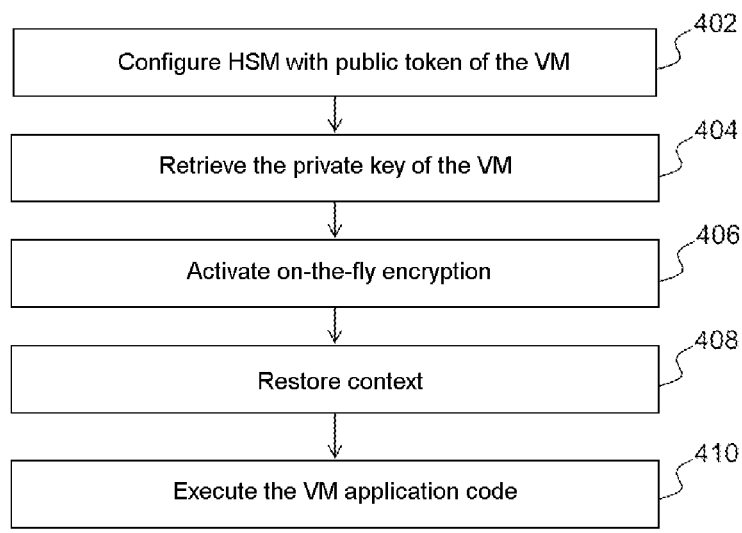
FIG. 4 shows the procedure executed during a change of virtual machine in the processor according to the principle of the invention.

FIG. 4 illustrates the steps performed during the switchover of a virtual machine in the processor. As described previously, the execution of an encrypted virtual machine is made possible due to the addition of the HSM encryption/decryption module which operates between the processor and the external memory.

When a VM must be started and executed by the processor, the hypervisor begins at step 402 by configuring the HSM module, supplying it with the token $T_{VM}$ of the VM. This token is present as preamble in the program which represents the encrypted virtual memory image.

The next step 404 consists, for the HSM module, in retrieving the encryption/decryption key $K_{VM}$. Either it is available in a cache memory of the HSM module, or the token $T_{VM}$ is sent to the authentication server AuS in order to receive in return the encryption/decryption key $K_{VM}$ stored therein.

Upon receiving the key, the HSM module can activate (406) on-the-fly encryption/decryption for the instruction and data stream from the VM.

Thus, the processor and therefore the hypervisor can send only two types of configuration requests to the HSM module:

- requests to change to encrypted mode: "cipher_mode (base$_{VM}$, T$_{VM}$)" in order to carry out encrypted exchanges with the memory with the key $K_{VM}=f_{LTS}(T_{VM})$;
- requests to change to clear mode: "clear_mode" order to carry out clear exchanges with the memory, which exchanges are particularly reserved for system code.

As detailed below, during the execution of a request, the context which is stored in encrypted area will be restored (step 408) before the execution of the application code of the task which was interrupted is allowed to resume (step 410).

In the example taken previously for 32-bit words, if the processor must carry out a read operation at the clear address "ptr" of a data or instruction word during an encrypted type request, the HSM module retrieves the 128 bits of the corresponding encrypted block, at the following physical address in the VM:

$$base_{VM}+(ptr\&0xfffffffe)<<1$$

where $base_{VM}$ is the physical address of the start of the VM.

Then the HSM module decrypts with the key $K_{VM}$ the encrypted 128-bit block. This is the on-the-fly decryption operation. It retrieves the 128 clear bits and verifies the integrity of the data. It is to be noted that the fifth 16-bit word must be zero and the fourth 32-bit word must be equal to ptr&0xfffffffe.

The HSM sends to the processor either the first word if the clear address is even or the second word if the clear address is odd.

Similarly, if the processor must write to memory a 32-bit word at the clear address "ptr", the HSM module retrieves the 128 bits of the corresponding encrypted block at the following physical address:

$$base_{VM}+(ptr\&0xfffffffe)<<1$$

where $base_{VM}$ is the physical address of the start of the VM.

The HSM module decrypts the encrypted block with the key $K_{VM}$, then verifies the integrity of the data. It then replaces the first word if the clear address is even or the second word if the clear address is odd with the 32-bit word to be written.

Then the HSM module encrypts the new clear 128-bit block; this is the on-the-fly encryption operation. The encrypted block is sent to the VM memory to be written at the address indicated above.

Thus, the HSM encryption/decryption module provides an on-the-fly encryption or decryption of a data or instruction stream relative to a virtual machine which is solicited.

Figure 5:
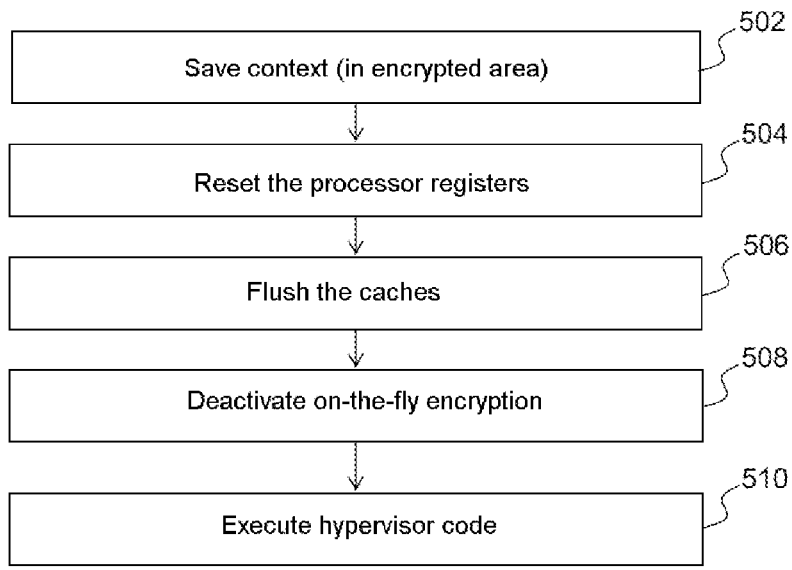
FIG. 5 shows the procedure executed during a change of virtual machine during an interrupt at the hypervisor according to the principle of the invention.

FIG. 5 shows the procedures executed during the change of a virtual machine outside the processor, triggered by an interrupt at the hypervisor.

Before the hypervisor takes control, an interrupt handler stored in the ROM is executed to partly re-initialize the processor.

In a first step (502) the execution context of the virtual machine is saved at a relative address in the encrypted memory space of the VM. Then at the next step (504), the registers used by this VM are reset and the cache of the processor is flushed (506).

The next step (508) consists in deactivating the on-the-fly encryption/decryption in order to switch the HSM module to clear mode, and prevent the hypervisor from having access to unencrypted data of the VM.

Then, the hypervisor can resume control to execute the code in progress (step 510).

Figure 6:
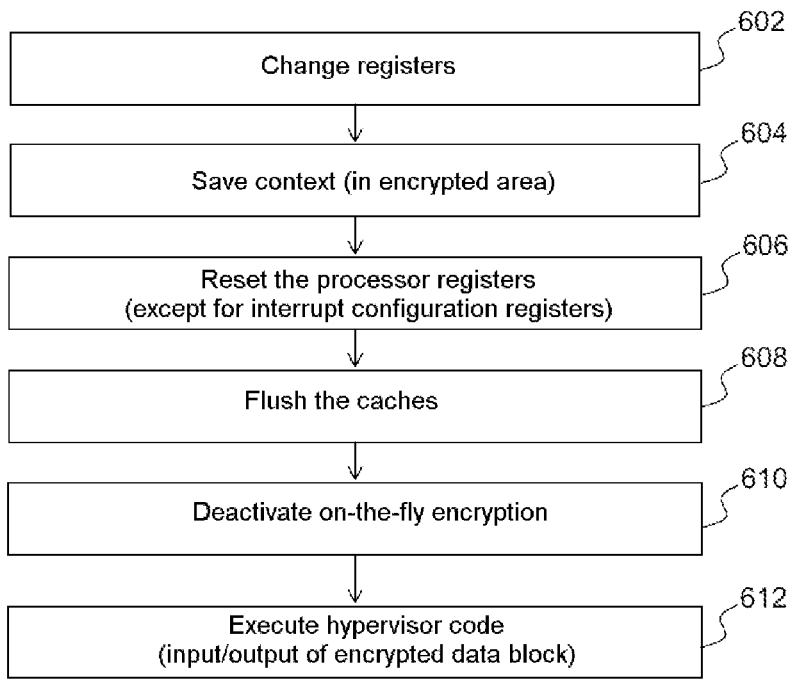
FIG. 6 shows the procedure executed during the processing of a user interrupt according to the principle of the invention.

FIG. 6 illustrates the operations executed when a user interrupt is processed. This is for example the case when, during the execution of an encrypted memory image, the program requests an intervention by the client machine, corresponding for example to an input on the keyboard or a display on a console, while an interrupt is already active.

Generally, the encryptions and decryptions of the memory are carried out on the client side, thus the key $K_{VM}$ is calculated from the token $T_{VM}$ with the aid of the chip card. The client maintains a local memory image of the input/output buffer. The local memory image is on-the-fly decrypted/encrypted in the client machine when the user enters or exits the cloud. Thus, the inputs/outputs are all executed under interrupt, i.e. a part of the ROM memory contains clear data which supplies an interrupt management mechanism.

The interrupt runs according to the following steps:
602: the registers which define the interrupt parameters (interrupt type, write or read address) are loaded in the encrypted program.
604: the context (registers, counter) is saved in the encrypted memory image;
606: all the registers are reset except for the registers used by the interrupt;
608: the processor cache is flushed;
610: the HSM module is switched to clear mode;
612: the hypervisor proceeds with the inputs/outputs and sends/receives the data to/from the client.

The inputs/outputs are carried out more precisely as follows:

The client receives the interrupt type (read or write) and the clear address within the encrypted memory image and the encrypted block.

The client decrypts the 128-bit block received with the key $K_{VM}$ and tests its integrity. If the integrity test fails, the client returns an error signal. If the integrity test passes, the client acts according to the type of interrupt:

if the interrupt corresponds to a display operation, the client displays the first word if the clear address is even or the second word if the clear address is odd;

if the interrupt corresponds to a write operation, the client modifies in the clear 128-bit block the first 32-bit word if the clear address is even or modifies the second 32-bit word if the clear address is odd.

Then the client encrypts the new 128-bit modified block with the key $K_{VM}$ and sends the encrypted 128 bits to the cloud.

After the end of the interrupt, the system returns to nominal mode.

Thus, the method according to the invention enables the changes and the saving of contexts during tasks, and the change from an encrypted mode to clear mode and vice versa, with the inputs/outputs under interrupt.

The person skilled in the art will appreciate that variations can be brought about on the method as described in a preferred manner, while maintaining the principles of the invention. The present invention can be implemented from hardware and/or software elements. It can be available as a computer program product on a computer-readable medium. The medium can be electronic, magnetic, optical or electromagnetic, or it can be an infrared type broadcast medium. Such media are for example semiconductor memories (Random Access Memory (RAM), Read-Only Memory (ROM)), tapes, floppy disks or magnetic or optical disks (Compact Disc—Read-Only Memory (CD-ROM), Compact Disc—Read/Write (CD-R/W) and DVD).

The invention claimed is:

1. In a cloud computing environment composed of a plurality of Virtual Machine (VM) servers wherein each VM server comprises a processor enabling an execution of hypervisor software in order to assign virtual machines to client terminals through a user network, and of at least one authentication server enabling a bilaterally authenticated connection between a client terminal and the cloud, a device for executing encrypted programs comprising:

a bilaterally authenticated connection establishment module for establishing a bilaterally authenticated connection between a client terminal and the cloud;

an encrypted memory image generation module for generating, in response to a request to connect to the cloud from said client terminal, an encrypted memory image for a virtual machine assigned to said client terminal; and a security module for execution in response to requests of read/write of data into said encrypted memory image received from the processor of said virtual machine, of on-the-fly encryption and decryption operations in read/write of the data associated with said encrypted memory image, wherein the encrypted memory image generation module comprises means for:
generating a private encryption key to assign a virtual memory image to said client terminal;
downloading to said client terminal the assigned virtual memory image;
encrypting the assigned virtual memory image; and
uploading the assigned and encrypted virtual memory image to the cloud; and wherein the bilaterally authenticated connection establishment module for establishing the authenticated connection between said client terminal and the cloud comprise chip card reader type means coupled to said client terminal to calculate an encryption key as a function of a personal code stored on the chip card and means coupled to an authentication server of the cloud for performing an authentication upon reception of the personal code.

2. The device as claimed in claim 1, wherein the personal code is a 128-bit long term secret.

3. The device as claimed in claim 1, wherein the private encryption key generated for a virtual machine is a function of the personal code.

4. The device as claimed in claim 1, wherein the private encryption key is stored in the authentication server.

5. The device as claimed in claim 4, wherein the execution of an on-the-fly encryption or decryption operation performed in response to a request to read a word at a clear address of the memory of one of the servers comprises:
receiving from the authentication server the private encryption key;
retrieving in the encrypted memory image an encrypted data block containing the clear address of the word to be read;
decrypting the encrypted block with the private encryption key;
extracting the word to be read in the decrypted block; and
sending the extracted word to the processor of one of the servers.

6. The device as claimed in claim 4, wherein the execution of an on-the-fly encryption or decryption operation performed in response to a request to write a word at a clear address in the memory of one of the servers comprises:
receiving from the authentication server the private encryption key;
retrieving in the encrypted memory image an encrypted data block containing the clear address of the word to be written;
decrypting the encrypted block with the private encryption key; and
writing the word at the clear address in the decrypted block.

7. The device as claimed in claim 1, additionally comprising an interrupt management module.

8. In a cloud computing environment composed of a plurality of Virtual Machine (VM) servers wherein each VM server comprises a processor enabling an execution of hypervisor software in order to assign virtual machines to client terminals through a user network, and of at least one authentication server enabling a bilaterally authenticated connection between a client terminal and the cloud, a method for executing encrypted programs comprising the steps of:

after the establishment of a bilaterally authenticated connection between a client terminal and the cloud in response to a request to connect to the cloud from the client terminal, generating an encrypted memory image for a virtual machine assigned to said client terminal; and in response to requests of read/write of data into said encrypted memory image received from the processor of said virtual machine, executing on-the-fly encryption and decryption operations in read/write of the data associated with said encrypted memory image, wherein the step for generating an encrypted memory image additionally comprises the steps of:
generating a private encryption key to assign a virtual memory image to said client terminal;
downloading to said client terminal the assigned virtual memory image;
encrypting the assigned virtual memory image; and
uploading the assigned and encrypted virtual memory image to the cloud; and wherein the step for enabling the authenticated connection between said client terminal and the cloud comprises a step for calculating an encryption key as a function of a personal code stored on a chip card read by chip card reader means coupled to said client terminal and a step for authenticating the personal code upon reception of the code by the authentication server.

9. The method as claimed in claim 8, wherein the execution of an on-the-fly encryption or decryption operation is performed in response to a request to read a word at a clear address of the memory of one of the servers and comprises the steps of:
receiving from the authentication server a private encryption key;
retrieving in the encrypted memory image an encrypted data block containing the clear address of the word to be read;
decrypting the encrypted block with the private encryption key;
extracting the word to be read in the decrypted block; and
sending the extracted word to the processor of one of the servers.

10. The method as claimed in claim 8, wherein the execution of an on-the-fly encryption or decryption operation is performed in response to a request to write a word at a clear address in the memory of said one of the servers and comprises the steps of:
receiving from the authentication server a private encryption key;
retrieving in the encrypted memory image an encrypted data block containing the clear address of the word to be written;
decrypting the encrypted block with the private encryption key; and
writing the word at the clear address in the decrypted block.

11. A non-transitory computer program product, said non-transitory computer program product comprising code instructions for carrying out the steps of the method as claimed in claim 8, when said non-transitory computer program product is executed on a computer.

12. In a cloud computing environment composed of a plurality of servers and client terminals suitable for connecting to the cloud, one of the servers comprising a processor and a main memory enabling the execution of hypervisor software in order to assign virtual machines to the client terminals, a device comprising:

an encrypted memory image generation module for generating, in response to a request to connect to the cloud from a client terminal, an encrypted memory image of a virtual machine assigned to the client terminal;

a storage server to store the encrypted memory image; and a security module coupled to the storage server and to said one of the servers, to execute, in response to data read/write requests received from the processor of one of the servers, on-the-fly encryption and decryption operations of the data stream associated with said encrypted memory image, wherein the encrypted memory image generation module comprises means for:

receiving a request to connect to the cloud from a client terminal;

establishing a bilaterally authenticated connection between the client terminal and the cloud;

generating a private encryption key to assign a virtual memory image to the client terminal;

downloading to the client terminal the assigned virtual memory image;

encrypting the assigned virtual memory image; and uploading the assigned and encrypted virtual memory image to the cloud; and wherein the means for establishing the authenticated connection between the client terminal and the cloud comprise chip card reader type means coupled to the client terminal to calculate an encryption key as a function of a personal code stored on the chip card and means coupled to an authentication server of the cloud for performing an authentication upon reception of the personal code.

13. The device as claimed in claim 12, wherein the personal code is a 128-bit long term secret.

14. The device as claimed in claim 12, wherein the private encryption key generated for a virtual machine is a function of the personal code.

15. The device as claimed in claim 12, wherein the private encryption key is stored in the authentication server.

16. The device as claimed in claim 15, wherein the execution of an on-the-fly encryption or decryption operation performed in response to a request to read a word at a clear address of the memory of one of the servers comprises:

receiving from the authentication server the private encryption key;

retrieving in the encrypted memory image an encrypted data block containing the clear address of the word to be read;

decrypting the encrypted block with the private encryption key;

extracting the word to be read in the decrypted block; and sending the extracted word to the processor of one of the servers.

* * * * *